(12) United States Patent
Benthien

(10) Patent No.: US 11,136,124 B2
(45) Date of Patent: Oct. 5, 2021

(54) FASTENING SYSTEM FOR FASTENING A COMPONENT ON A FUSELAGE STRUCTURE

(71) Applicant: Airbus Operations GmbH, Hamburg (DE)

(72) Inventor: Hermann Benthien, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 487 days.

(21) Appl. No.: 16/222,457

(22) Filed: Dec. 17, 2018

(65) Prior Publication Data
US 2019/0193871 A1 Jun. 27, 2019

(30) Foreign Application Priority Data

Dec. 22, 2017 (DE) .......................... 102017131130.0

(51) Int. Cl.
*B64D 11/00* (2006.01)
*B64F 5/00* (2017.01)
*F16B 33/00* (2006.01)

(52) U.S. Cl.
CPC .............. *B64D 11/003* (2013.01); *B64F 5/00* (2013.01); *F16B 33/00* (2013.01)

(58) Field of Classification Search
CPC .............................. B64D 11/00; B64D 11/003
See application file for complete search history.

(56) References Cited

U.S. PATENT DOCUMENTS

| 5,395,074 A | * | 3/1995 | Hart | ..................... | B64D 11/003 244/118.1 |
| 5,549,258 A | * | 8/1996 | Hart | ..................... | B64D 11/003 244/118.1 |
| 5,716,027 A | * | 2/1998 | Hart | ..................... | B64D 11/003 244/118.1 |

(Continued)

FOREIGN PATENT DOCUMENTS

| DE | 102009014598 A1 | 9/2010 |
| DE | 102009028529 A1 | 2/2011 |

(Continued)

OTHER PUBLICATIONS

German Patent Office German Search Report for Application No. 10 2017 131 130.0, dated Oct. 18, 2018.

*Primary Examiner* — Philip J Bonzell
*Assistant Examiner* — Michael B. Kreiner
(74) *Attorney, Agent, or Firm* — Jenkins, Wilson, Taylor & Hunt, P.A.

(57) ABSTRACT

A system has a frame with first and second spaced apart edges, a first holder couplable to the fuselage structure and embodied for articulated connection to a first region of the frame that is close to the first edge, a second holder couplable to the fuselage structure, and a strut. A first end of the strut is connectable in an articulated manner to the second holder. A second end of the strut is connectable in an articulated manner to a second region of the frame near the second edge and remote from the first edge. The frame and the strut form a triangular structure with the first and second holders. The strut and the frame form two sides of the triangular structure. A length of the first and/or second side is variable to adjust the position of the frame.

15 Claims, 6 Drawing Sheets

(56) References Cited

U.S. PATENT DOCUMENTS

| | | | |
|---|---|---|---|
| 5,842,668 A * | 12/1998 | Spencer | B64D 11/003 |
| | | | 244/118.1 |
| 6,622,965 B1 * | 9/2003 | Sergiy | B64D 11/003 |
| | | | 244/118.1 |
| 7,234,666 B2 * | 6/2007 | Novak | B64D 11/003 |
| | | | 244/118.5 |
| 7,481,397 B2 * | 1/2009 | Steinbeck | B64D 11/003 |
| | | | 244/118.5 |
| 9,308,995 B2 * | 4/2016 | Spellman | B64D 11/00 |
| 9,758,233 B2 * | 9/2017 | King | B64C 1/066 |
| 10,364,032 B2 * | 7/2019 | Kammerer | B64D 11/00 |
| 2009/0218777 A1 | 9/2009 | Wood | |
| 2015/0035424 A1 * | 2/2015 | Rittner | B64D 11/003 |
| | | | 312/327 |
| 2018/0258673 A1 * | 9/2018 | Schoerkhuber | B64D 11/003 |
| 2019/0092473 A1 * | 3/2019 | Benthien | B64D 11/003 |

FOREIGN PATENT DOCUMENTS

| | | |
|---|---|---|
| EP | 3135585 A1 | 3/2017 |
| EP | 3153407 A1 | 4/2017 |
| WO | 9838089 A1 | 9/1998 |

* cited by examiner

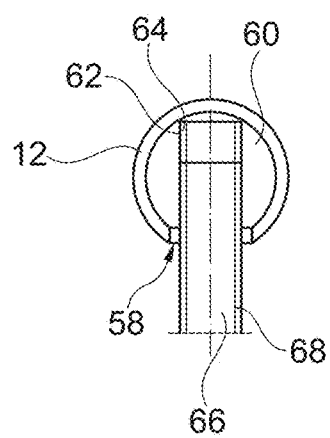
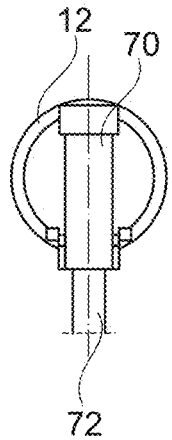
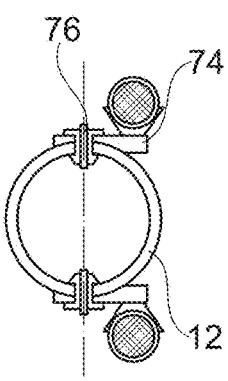
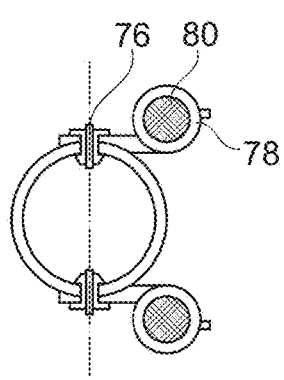
Fig. 5a  Fig. 5b  Fig. 5c  Fig. 5d
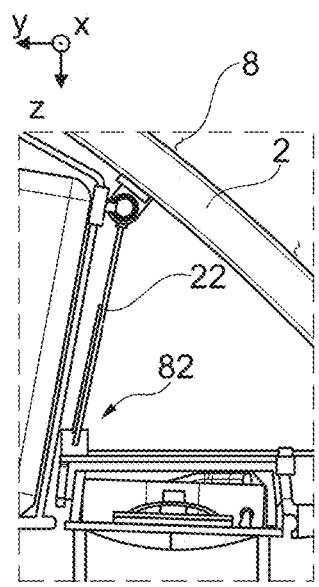
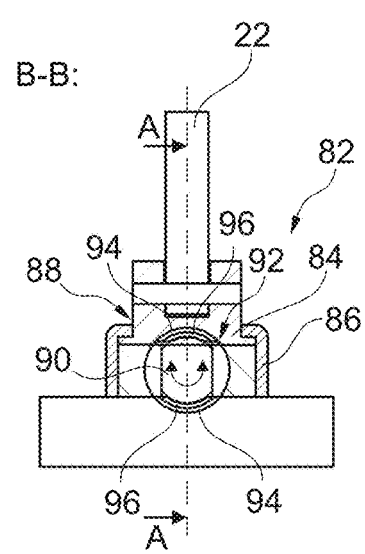
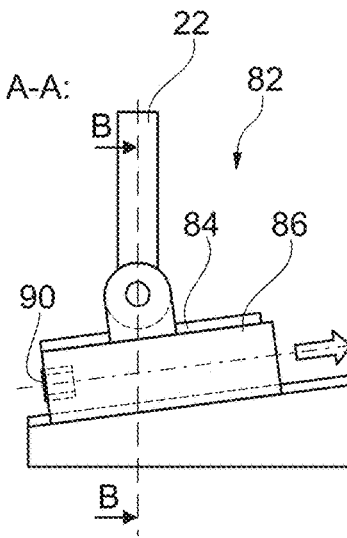
Fig. 6a  Fig. 6b  Fig. 6c

FASTENING SYSTEM FOR FASTENING A COMPONENT ON A FUSELAGE STRUCTURE

CROSS-REFERENCE TO PRIORITY APPLICATION

This application claims the benefit of, and priority to, German patent application number DE 102017131130.0, filed Dec. 22, 2017. The content of the referenced application is incorporated by reference herein.

TECHNICAL FIELD

Embodiments of the subject matter described herein relate generally to a fastening system for fastening a component on a fuselage structure in an interior of an aircraft, an aircraft having a fuselage with a fuselage structure, and at least one component which is fastened on the fuselage structure by means of a fastening system of this kind.

BACKGROUND

In an aircraft which has a fuselage, there is usually a passenger cabin with a multiplicity of items of equipment. For this purpose, the fuselage, which is built up by means of the fuselage structure, is provided on the inside with a multiplicity of holders, which are matched individually to the items of equipment to be held and ensure the secure mounting of said items of equipment at a predetermined location. In the case of aircraft and especially relatively large passenger aircraft with fuselage lengths of well over 10 m, certain manufacturing tolerances must always be expected, and these must be taken into account in the arrangement of holders. While items of equipment in the fuselage should comply with a clearly predetermined geometry, the individual holders must be adapted to compensate for the production tolerances of the fuselage structure. For example, any undulation in a line or surface formed by several overhead storage bins should be restricted to a significantly greater extent than, for example, dimensional tolerances of the fuselage structure.

Compensating tolerances in order to adapt the visible contour within a cabin of an aircraft is laborious. In particular, adjustment can involve opening and closing screwed joints including, for example, nuts and lock nuts on screw elements. Moreover, customization or retrofitting of items of equipment is difficult owing to the required holders on the fuselage structure since additional holding devices must be mounted on structural components or existing holding devices must be removed and reattached at some other location. For emergencies ("Emergency Case"), items of equipment are secured in the fuselage against crash accelerations. If the position of the items of equipment changes, a new attachment point must also be created on the fuselage, and the old attachment point must be removed. It is also the object of the disclosure to obviate this expenditure.

BRIEF SUMMARY

It could be very advantageous to have available a fastening system which allows flexible, customizable or retrofittable mounting of items of equipment. This should as far as possible be achieved without complex modification and without a high outlay on production.

Consequently, it is the object of the disclosure to propose a fastening system for fastening components on a fuselage structure in an aircraft which can be used as flexibly as possible to hold items of equipment and is capable of introducing loads in a uniformly distributed manner into attachment points of the structure, wherein adjustment should be as simple as possible, particularly for tolerance compensation. The object shall likewise include avoiding the outlay for the abovementioned removal of old attachment points and the production of new attachment points.

The object is achieved by a fastening system having the features of independent claim 1. Advantageous developments and embodiments can be found in the dependent claims and the following description.

A fastening system for fastening components on a fuselage structure in an interior of an aircraft is proposed. The fastening system has a holding frame with a first edge and a second edge spaced apart from the first edge, at least one first holder, which can be coupled to the fuselage structure and is embodied for articulated connection to the holding frame in a first region of the holding frame, said region being close to the first edge, at least one second holder, which can be coupled to the fuselage structure, and at least one holding strut, a first end of which can be connected in an articulated manner to the second holder and a second end of which can be connected in an articulated manner to the holding frame in a second region adjacent to the second edge and remote from the first edge. The holding frame, the holding strut as well as the first holder and the second holder are designed to form a triangular structure with the first and second holder, which are arranged spaced apart from one another along a circumferential direction of the fuselage structure, wherein the holding strut and the holding frame form a first side and a second side of the triangular structure. At least one of the holding frame, the holding strut, the first holder and the second holder is designed to variably set a length of the first side and/or of the second side in order to adjust the position of the holding frame.

Consequently, the fastening system has a series of main components which together result in very advantageous and easily handled devices for fastening a component.

A holding frame of the type mentioned above is used to hold a component or attach it to the fuselage structure. Here, the holding frame can form part of the component, can carry a component or can hold a multiplicity of independent or interlinked components. Irrespective of the external shape, the only requirement for the system according to the disclosure is that the holding frame should have two regions, which each lie in the vicinity of one boundary edge of the holding frame and can be connected to a first holder or a holding strut. In particular, a holding frame can have a flat, planar shape. This shape does not necessarily have to be completely filled with material. The planar shape can also be merely a plane of extent in which a frame or framework structure that allows connection to a first holder or a holding strut is arranged. Depending on the embodiment of the aircraft or of the cabin, the holding frame can have a length such that it is fastened on the fuselage structure by a plurality of first holders, a plurality of holding struts and consequently a plurality of second holders.

A first holder is provided for the connection of a fuselage component and the holding frame. The first holder can be connected directly to a component of the fuselage structure. As an alternative, the first holder can also be connected to the fuselage structure indirectly, that is to say via at least one further component situated in between. For example, the first holder can be coupled to a fuselage frame, a flange, an intersection point between a fuselage frame and a longitudinal reinforcing element (stringer) or some other component. In a simple case, the first holder can be a type of clamp which grips a fuselage structure component in the manner of tongs and is secured positively or materially in a desired position.

The second holder can be embodied in a manner similar to the first holder and serves to retain the first end of the holding strut. It can be advantageous to arrange first holders and second holders in pairs on the same fuselage structural component or at least at the same longitudinal position within the fuselage.

The first and second holders, which can be mounted on the fuselage structure, can be fastened at regular intervals on fuselage structural components. It is conceivable for the holders to be arranged on the fuselage structure during the production of the fuselage or of the fuselage structure itself. This can be independent of the subsequent configuration of the interior of the aircraft. As a particularly preferred option, the first and second holders can be embodied as additions to already existing angles, flanges or the like, which must be used for the production of the fuselage structure in any case. By means of suitable modification of the external shape of such components, appropriate suitability as a first or second holder can be achieved.

The holding strut can be understood as an elongate component or as a component which is distinguished at least by one significant direction of extent. The holding strut holds the holding frame by means of the second region of the latter on the second holder, wherein the first region of the holding frame is arranged on the first base body by way of a first holder. The holding strut therefore extends from the fuselage structure into the interior of the cabin in order to retain there a second region of the holding frame, which is remote from the fuselage structure and which likewise extends into the cabin. The holding strut and the holding frame thus form two sides of the triangular structure, which extend into the cabin.

For adjustment of a spatial alignment of the holding frame, which subsequently defines the spatial alignment of the component to be retained, at least one of the holding frame, the holding strut, the first holder and the second holder can be designed to adjust a length of the first side and/or of the second side.

The alignment of the holding frame on the first holder can be changed, for example, by means of an adjustable spacing between the first holder and the holding frame. For a series of holding frames which are arranged one behind the other in a cabin, a lateral position of all the holding frames concerned, for instance, can be adjusted by this means, with the result that they jointly lead to a harmonious arrangement if the first holder is used for lateral retention.

For further adjustment of the alignment of the holding frame, the spacing between the second region of the holding frame and the second holder can be changed. If this spacing is supposed to remain the same, however, it is also possible to change the position of a joint between the holding frame and the second end of the holding strut in the second region. Both these adjustment options can also be combined with one another. Overall, therefore, a very flexible possibility of performing an adjustment is proposed.

However, there is another advantage with this embodiment, which results from very advantageous assembly. For example, a component which is to be attached to the holders can initially be attached to corresponding second holders via the holding strut or a plurality of such holding struts. If a whole series of components of the same design is attached to the fuselage structure, all these components can be attached by means of a multiplicity of holding struts at this early stage, and consequently they hang down from the second holder. In this position, fitting, mechanical or electrical connection or similar can be carried out before all the components can then be fastened by being swiveled up to the first holder. Of course, this can also be performed the opposite way round by first of all hanging all the components on the first holder or holders and then connecting them to the corresponding second base bodies by swiveling up and connecting the holding struts. This makes installing and especially interconnecting the individual components significantly easier. In one particular example, this advantage can be obtained by virtue of the fact that electric or pneumatic systems assigned to a service duct or to a multiplicity of service units above passenger seats can be arranged behind an overhead storage bin with a shortened profile.

An advantageous embodiment furthermore has at least one elongate base body, wherein the at least one elongate base body can be fastened on a plurality of first and/or second holders and is designed to introduce a force acting along an axis of extent of the base body into a plurality of first and/or second holders. An elongate base body is an elongate, rod-type body which can be fastened on the fuselage structure with the aid of a plurality of holders.

In particular, the base body is provided for the purpose of absorbing forces which act along the axis of extent of the base body and are transmitted by the base body along the direction of extent thereof. Here, the forces can be introduced into a base body of this kind by means of first holders and/or second holders or can be absorbed from the base body by first and/or second holders. It is conceivable, by means of such a compound structure, to relieve forces on one or more holders that are aligned along the direction of extent of the base body.

Furthermore, a base body is capable of retaining component holders, which can, in turn, be used to hold a component. Embodiments are described further below.

By virtue of their arrangement on the fuselage structure the base bodies can form a kind of interface, by means of which forces can be transmitted from the items of equipment or components to the fuselage structure. These are, in particular, mass and inertia forces. A base body can extend over a significant part of the fuselage, in particular along a longitudinal axis of the fuselage. In particular, a base body can have a uniform constant cross section, thus enabling the same preconditions for retention of a component to be created at any desired point within the fuselage. The cross section of the base body is immaterial in this context. As described further below, it may be appropriate to provide a round cross section.

In an advantageous embodiment, the first base body and the second base body are each designed as a tube. The use of a tube has particular advantages in respect of fastening on the fuselage structure. Moreover, a tube as such is particularly easy to manufacture by established methods and can also be produced in relatively large lengths. In the case of passenger aircraft with aircraft fuselages which significantly exceed a length of 10 m, it is possible to operate here with long tubes of uninterrupted construction. The cross section of such a tube is distinguished by an encircling wall and a cavity. The thickness of the wall and the outside diameter of the tube are dependent on the envisaged loading and the material used. Possible suitable materials are, in particular, metals, especially alloys based on aluminum. These then have a similar expansion behavior as a metal fuselage structure.

In an advantageous embodiment, the first and second holders are designed to rigidly retain the respective base body. It is conceivable for a multiplicity of first and second holders to extend along the fuselage structure in order to retain one or more base bodies. In an embodiment of this kind, the material configuration of the base bodies could be provided in such a way that a base body can be bent to a certain degree in order to compensate for an adaptation to position deviations, within the manufacturing tolerances, of the individual first and second holders. A base that is particularly simple to produce for the arrangement of any desired components and for transmitting forces in a fuselage of an aircraft is thereby made possible. Even with a base of this kind, sufficient accuracy of the alignment of the components can be achieved through the compensation possibilities of the fastening system.

At this point, it should be noted that the first holder can form a holder both for the holding frame and for a base body.

The first holder can be designed to set an adjustable spacing between the first region of the holding frame and the first holder. It is thereby possible to enlarge or reduce the side length formed by the holding frame, depending on local circumstances. The adjustable spacing can be achieved by various means. Apart from a customary combination of a screw element and a nut and/or lock nut, a retaining pin and other retaining measures, it is also possible to use toothed elements, which can be inserted and secured in variable positions in a toothed mating part.

The first holder can have a first connector with an opening that has a first tooth system in some region or regions, and a second connector with an elongate body that has a second tooth system in some region or regions, wherein, in a first alignment with respect to the opening of the first connector, the elongate body can be inserted into said opening and, by rotation into a second alignment, establishes a positive joint between the first tooth system and the second tooth system. One of the first connector or the second connector can be coupled permanently to the fuselage structure, while the other of the first connector or the second connector can enter into a joint with this connector, which is then fixed with respect to the structure. Consequently, the insertion depth of the second connector can be chosen by combining the first connector and the second connector and then locking them by rotation. By means of this measure, it is easily possible to choose the insertion depth of the second connector in such a way that the first region of the holding frame is situated at a desired distance from the fuselage structure. In this case, the gradation of the distance is directly dependent on the toothing of the first connector and the second connector. It is irrelevant here on which side of the first holder the opening or the elongate body is attached. However, care should be taken to ensure that, when installing the component, good access to the elongate body or to the body having the opening is achieved, thus enabling a rotation to be carried out during installation. This type of adjustment is very expedient since the elongate body can be inserted into the opening only to a certain extent, owing, for example, to an assembly frame that predetermines an end position of the holding frame, and is then rotated, thereby securing the position reached. The screw fastening, the installation of a retaining pin and the like could be eliminated here.

Of course, these features can also be implemented in the abovementioned second holder.

To achieve these features, the first holder and/or the second holder can be provided with a fastening cylinder, which can be positioned in the first and/or second holder. If there is an elongate base body in the form of a tube in the holder concerned, the fastening cylinder can be inserted into this body, with the result that it lies directly within the holder concerned. Access to the fastening cylinder from outside can be gained through a slot or an aperture in the base body, which corresponds to a slot or an aperture in the holder concerned. For example, the fastening cylinder can have a longitudinal axis and a transverse axis extending perpendicularly thereto. An opening with a tooth system arranged therein extends along the transverse axis. Consequently, the opening with the tooth system forms the first connector. An elongate body having a second tooth system can be inserted from outside into the fastening cylinder through the holder concerned and the opening or aperture in the tube in order to bring about a positive joint at a desired insertion depth by subsequent rotation.

The holding strut can be provided with a similar configuration. The holding strut or the second holder can have a first connector with an opening that has a first tooth system in some region or regions, and a second connector with an elongate body that has a second tooth system in some region or regions, wherein, in a first alignment with respect to the opening of the first connector, the elongate body can be inserted into said opening and, by rotation into a second alignment, establishes a positive joint between the first tooth system and the second tooth system. Consequently, an end of the holding strut remote from the holding frame and/or a side of the holding strut facing the holding frame can be provided with a similar adjustment possibility as the first holder.

For the acoustic decoupling of the fastening cylinder and of the first or second base body, it is conceivable to use a decoupling component made from a plastic. This can surround the fastening cylinder in the form of a ring and can be inserted into the base body concerned together with the fastening cylinder. To reach a transverse hole with toothing therein in the fastening cylinder, the decoupling component can be provided with a cutout, in particular a slotted hole.

The decoupling component preferably comprises a plastic. As a particular preference, the plastic is a thermoplastic.

The fastening system can furthermore have at least one tolerance compensating device, which is arranged in the second region of the holding frame, wherein the tolerance compensating device can be connected to the holding strut and is designed to shift and lock a connecting position of the holding strut on the holding frame between the second edge and the first edge. With an otherwise unchanged length of the holding strut, very fine adjustment, particularly of the positioning angle of the holding frame, can be performed in accordance with the geometry of the triangular structure.

This tolerance compensating device can have a slide, which is pivotably connected to the holding strut, and an elongate depression, which is arranged on the holding frame and has a slideway extending along the extent of the depression to provide sliding guidance for the slide, wherein the depression and the slide are each provided with a first tooth system in some region or regions, and wherein an elongate locking element with a second tooth system in some region or regions is positioned in the depression and is designed to establish a positive joint between the first tooth system and the second tooth system in a first alignment, such that the position of the slide on the slideway is locked, and to release the positive joint in a second alignment. Consequently, the holding strut can be shifted along the depression by the slide when the elongate locking element is aligned in such a way that there is no tooth system forming a positive joint with the elongate locking element. It is therefore very easy to adjust the positioning angle of the holding frame, e.g. with the locking element released and the holding frame placed on a support. Once a desired end position has been reached, the locking element can perform locking.

In a particularly advantageous embodiment, the holding frame can be a part of the component to be fastened. It is possible, for instance, for the component to be a module which allows various devices for communication between a passenger and some other electronic device. Furthermore, an oxygen supply device and a corresponding electronic unit can be arranged thereon. All of these elements can be arranged on a common module support or the like, which forms the holding frame. Of course, further examples and embodiments are conceivable, which can be positioned at any desired point within an interior of an aircraft.

The disclosure furthermore relates to an aircraft having a fuselage with a fuselage structure and at least one component which is fastened on the fuselage structure by means of a fastening system described above. In particular, the aircraft can be a passenger aircraft.

In an advantageous embodiment, the component can be a service unit for passengers or an overhead storage bin. Both of these components form a large part of a passenger cabin of an aircraft since the overhead storage bins and the service units extend above the passenger seats virtually throughout the entire cabin. The fastening system according to the disclosure makes it possible to allow a very uniform alignment of the individual components, ensuring that the visual appearance in the cabin meets all requirements.

The fuselage can have a longitudinal axis, a right-hand side and a left-hand side and can have at least one elongate base body along a significant part of the fuselage on the right-hand side and on the left-hand side. Base bodies spaced apart from one another in the circumferential direction can furthermore be provided on each side of the fuselage. It is also possible to conceive of other base bodies which can be arranged in the cabin to retain different components.

Furthermore, the aircraft has at least one monument and at least one monument holder, wherein the monument stands on a floor arranged in the fuselage and is connected by the at least one monument holder, by means of a monument section spaced apart from the floor, to a base body. For example, an underside of the monument can be fastened close to the floor, e.g. on a floor or seat rail. At an end remote therefrom or a region which is at least remote therefrom, the monument holder makes it possible to allow secure fastening on a base body. In particular, this monument holder is intended to absorb forces which act along the longitudinal axis of the fuselage.

The monument holder can be embodied as an elongate strut, which is connected by one end to the section of the relevant base body which is spaced apart from the monument along the longitudinal axis and by another end to the monument. Consequently, the monument holder extends away from the monument along the longitudinal axis, ensuring by means of this attachment that pressure forces and tensile forces, in particular exclusively such forces, act on the corresponding base body. The monument holder can be embodied in a manner similar to the holding strut mentioned above. In particular, to compensate for tolerances, the monument holder can likewise be provided with a device which makes a position along the base body adjustable.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible uses of the disclosed system will be found in the following description of the embodiment examples and the figures. Here, all the features described and/or depicted, in themselves and in any desired combination, form the subject matter of the disclosure, even when considered independently of their combination in the individual claims or the dependency references thereof. In the figures, the same reference signs furthermore stand for identical or similar objects.

FIGS. 5a to 5d show various configurations of a base body.

FIGS. 6a to 6c show a tolerance compensating option for the fastening of a holding strut.

DETAILED DESCRIPTION

Figure 1:
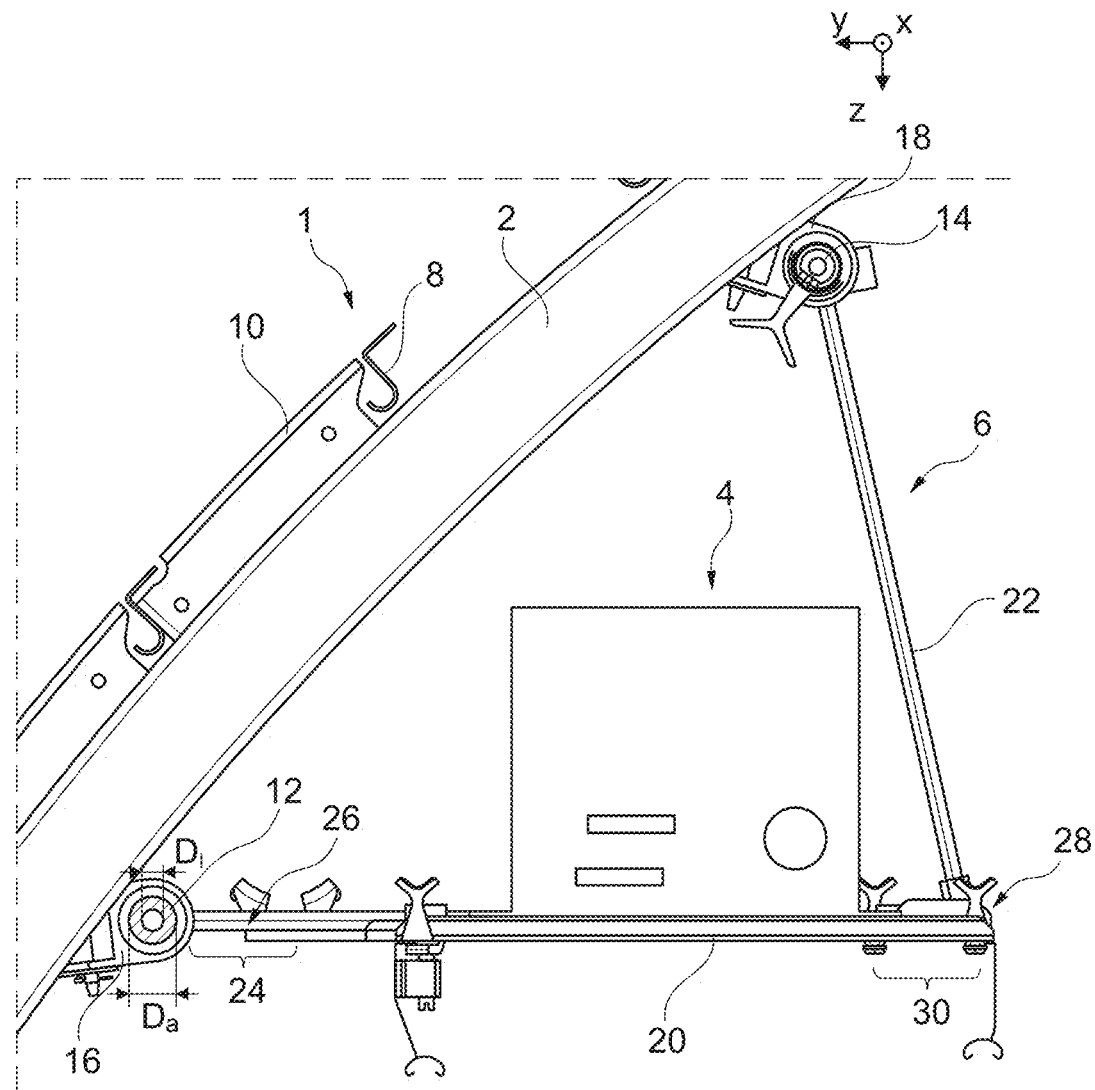
FIG. 1 shows a component fastened by means of the fastening system on a fuselage structure of an aircraft.

FIG. 1 shows a fuselage structure 1 with a component 4 which is attached to the fuselage structure 1 by means of a fastening system 6. By way of example, the fuselage structure 1 is illustrated in the form of a fuselage frame 2, which usually encircles a fuselage of an aircraft on the inside thereof substantially completely. A plurality of fuselage frames 2 is arranged spaced apart along the longitudinal axis x. Of course, longitudinal reinforcing elements 8 can also be present, which are directly connected to an external skin 10 and to the fuselage frames 2 and extend along the longitudinal axis x of the fuselage while being spaced apart from one another in the circumferential direction.

By way of example, the component 4 can be part of a service unit (Passenger Service Unit, PSU), which is arranged above passenger seats and makes available various devices for passengers. In particular, devices which are supplied with electricity, data and air can be arranged there. The component 4 in FIG. 1 is very greatly simplified and can be fitted with various supply lines.

In this example, the fastening system 6 has a first elongate base body 12, a second elongate base body 14, a plurality of first holders 16 and a plurality of second holders 18, with the aid of which, inter alia, the base bodies 12 and 14 are retained on the fuselage structure 2. Furthermore, the fastening system 6 has a holding frame 20 and holding struts 22.

The two base bodies 12 and 14 can be embodied in the form of tubes which extend substantially over the entire length of the fuselage to be fitted with components 4. The base bodies 12 and 14 have an outside diameter Da and an inside diameter Di, the size of which can be matched to the material properties of the base bodies 12 and 14. It is conceivable for the base bodies 12 and 14 to be fastened on every fuselage frame 2 within the vehicle fuselage which they intersect or past which they extend. In other words, this means that the base body 12 or 14 is rigidly connected by first holders 16 and second holders 18, respectively, to a multiplicity of points of the fuselage structure 2. For each base body 12, 14, a chain of first holders 16 and second holders 18, respectively, which are attached to the fuselage structure 1, is thus provided. These holders 16 and 18 are then used to absorb all the loads which are absorbed by the base bodies 12 and 14.

The first base body 12 is connected to a first region 24 of the holding frame by means of the first holder 16. The first region 24 should be understood as a position which is close to a first edge 26 of the holding frame 20 and is fitted with a corresponding device for connection to the first holder 16. This is explained further below.

The holding frame 20 furthermore has a second edge 28, which lies opposite the first edge 26. Here, there is a second region 30, which is fitted with a corresponding socket for connection to the holding strut 22. This is explained in greater detail in the figures which follow below.

At the same time, the holding strut 22 is connected not only to the holding frame 20 in the second region 30 but also to the second holder 18. This therefore gives rise to a fastening triangle, in which one side is formed by the holding frame 20 and another side is formed by the holding strut 22. An imaginary connecting line between the first base body 12 and the second base body 14 should be interpreted as the third side. By means of such an arrangement, the installation of a component 4 can be made significantly easier in comparison with known methods and, furthermore, the triangular structure significantly improves the alignment of the holding frame 20 in space, that is to say in the cabin of the aircraft.

Adjustment of a spacing of the first edge 26 from the first base body 12 or the first holder 16 and adjustment of the length of the holding strut 22 or the attachment thereof to the second base body 14 or the second holder 18 and/or to the holding frame 20 allows alignment in two dimensions over relatively large angular and linear ranges. The possible embodiments of adjustable holders, that is to say the adjustable first holder 16 and the second holder 18 and the attachment of the holding strut 22 are explained further below.

Figure 2A:
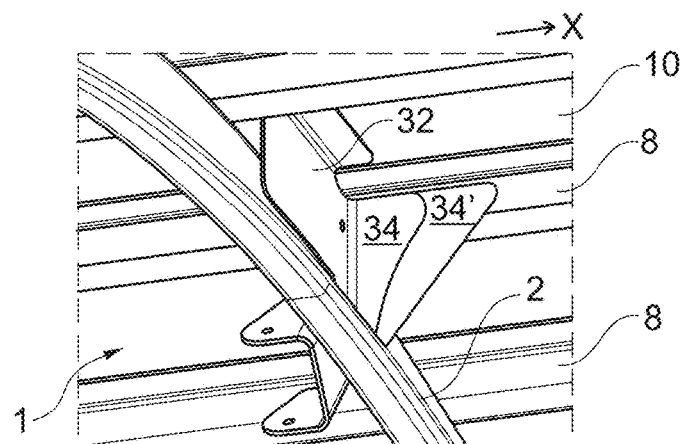
FIGS. 2a to 2c show the arrangement of a second holder 18 on the fuselage structure.
Figure 2B:
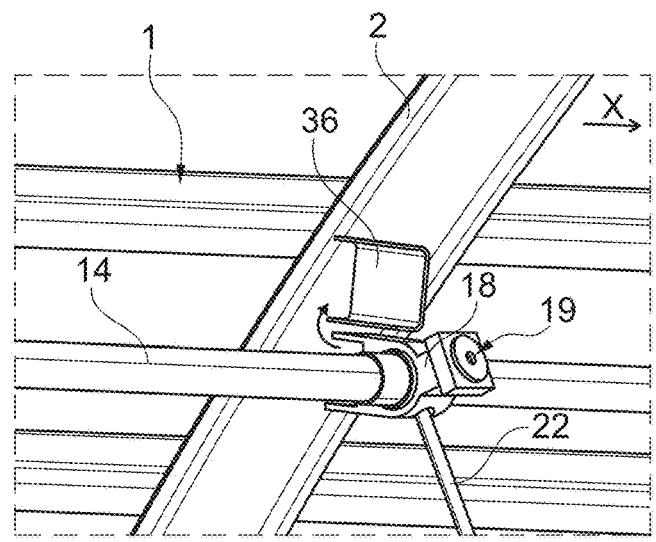
Figure 2C:
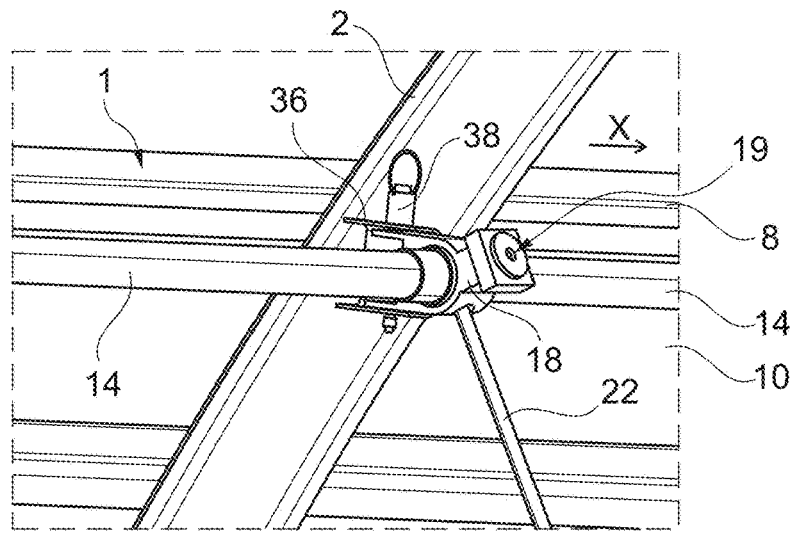

FIGS. 2A to 2C illustrate a fuselage structure 1, on which a plurality of flanges 32 are arranged, which can be connected both to a fuselage frame 2 and to the fuselage skin 10. The flanges 32 have a shape with multiple angles and allow retention of the fuselage frame 2 on the fuselage skin 10 and/or on the stringers 8. The fastening system 6 can be connected to flanges 32 of this kind.

For this purpose, a surface section 34 extending along the longitudinal axis x should be enlarged, at least in some region or regions by way of example, giving rise to an extent which is denoted by 34'. This very slight modification of the flange 32 leads to the capacity of the fuselage structure 1 to absorb even greater loads. A modification of the flanges 32 can preferably extend over the entire fuselage structure 1, wherein the flanges 32 should be integrated directly during the production of the fuselage structure 1 or the aircraft itself.

A mounting device 36, which is connected to the flange 32, is illustrated on an opposite side of the fuselage frame 2 from the flange 32. By way of example, the mounting device 36 has a U-shaped profile and, in this case shown, serves to receive the second holders 18 or is a part thereof. It may be appropriate likewise to integrate the mounting devices 36 during the production of the fuselage structure 1 or of the aircraft itself to enable second holders 18 to be mounted if required. However, this is not absolutely necessary: the mounting devices 36 could also be installed afterwards.

Fitting the fuselage structure 1 with such flanges 32, which are slightly enlarged by way of example, allows very flexible fitting of the fuselage, as required, with first holders 16, second holders 18, base bodies 12 and 14, on which components 4 can be retained, for instance.

The mounting of a second holder 18 on the fuselage structure 2 is indicated in FIG. 2b.

At this point, a locating surface 19, which faces away from the fuselage frame 2, which will be mentioned again with reference to FIG. 3 and is used for mounting an overhead storage bin, is conspicuous.

Once a mounting device 36 has been attached to the fuselage structure 2, a base body 14, which has already been fitted with second holders 18 for example, can be moved up to the mounting device 36 and then fastened there, by way of example using a retaining pin 38 or some other device. It may be expedient, when installing a whole series of components 4, to provide a holding frame within the cabin, on which already prepared base bodies 14 with components 4 attached thereto are moved up to all the mounting devices 36. Fastening can then be carried out progressively along the entire extent of the cabin. Of course, the fastening can also be performed the opposite way round, such that prepared base bodies 12 with first holders 16 arranged thereon are moved up in the cabin to the fuselage frames 2 with mounting devices (not shown) arranged thereon, after which fastening is carried out.

As explained with reference to FIG. 1, the fastening system according to the disclosure can carry out particularly simple compensation of tolerances. The purpose of this is to enable components 4, especially those arranged one behind the other along the longitudinal axis of the aircraft, to be aligned relative to one another in such a way that they form a very uniform, continuous surface, and said surface can preferably be substantially free of undulations, steps or other irregularities, irrespective of the undulation of the fuselage structure 1.

Figure 3:
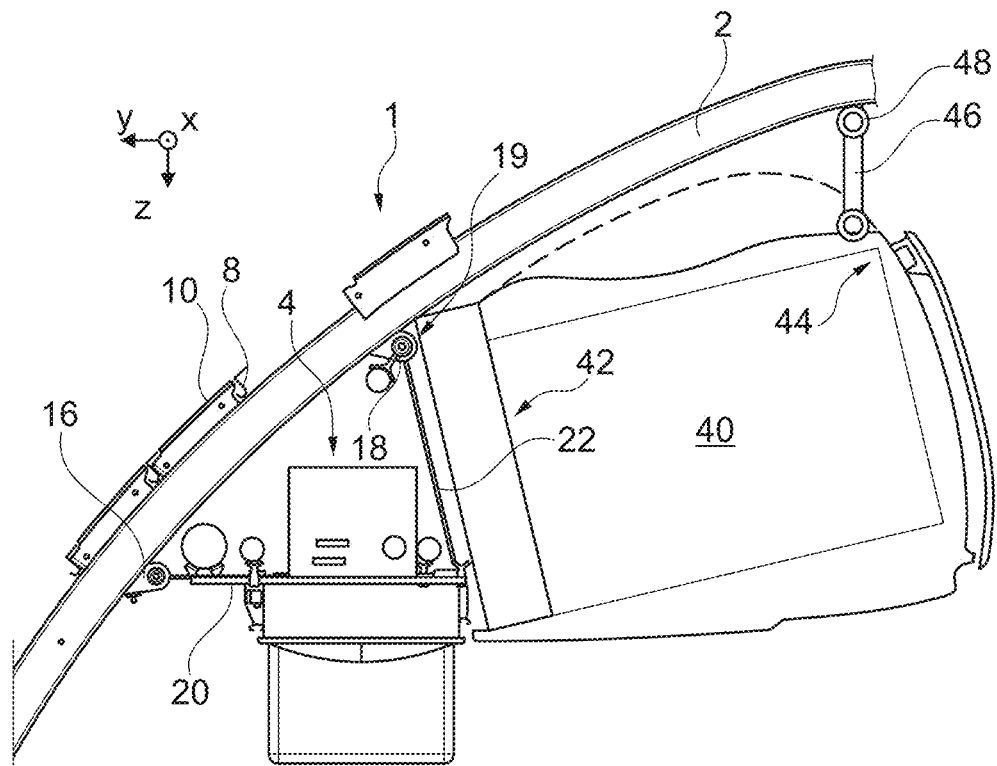
FIG. 3 shows an arrangement comprising an overhead storage bin and a component on the fuselage structure.

FIG. 3 shows a somewhat smaller view of the fuselage structure with the component 4 according to FIG. 1 and an additional overhead storage bin 40. This is modified in such a way as compared with known overhead storage bins that it has a reduced depth in comparison with known storage bins. Whereas a conventional overhead storage bin often extends further in the direction of the fuselage frame 2 situated behind it, the overhead storage bin 40 shown here has a straight rear edge 42, which extends approximately parallel to the holding strut 22 and is spaced apart somewhat from the latter. An upper region of the rear edge 42 or of the rear boundary surface 42 rests on the bearing surfaces 19 of a plurality of second holders 18 and, in particular, is screwed thereto. A front region 44 of the storage bin 40 is provided with a holding strut 46, which extends upwards from the storage bin 40 in the direction of the fuselage frame 2. There, the holding strut 46 is connected to a third holder 48. The holding strut 46 and the third holder 46 can be embodied in a manner similar to the holding strut 22 and the first holder 16. In particular, the third holder 48 can be provided with the same adjustment possibilities as the second holder 18. All that is missing there is the bearing surface 19, which is provided exclusively for mounting the storage bin 40 on the second holder 18.

Through the independent fastening of the storage bin 40 on the fuselage structure 1 or on the fuselage frames 2, the advantageous configuration of the component 4 can be achieved. Whereas, in the case of conventional storage bins, an arrangement of electronic modules, air nozzles and the like can be mounted on a rear side of a storage bin, advantageous separate production and separate retention can be achieved by means of the configuration shown in FIG. 3. For example, the storage bin 40 can first of all be mounted on third holders 48 by means of holding struts 46. After the mounting of holding struts 22 of the component 4 on second holders 18, the storage bins 40 can be swiveled up for fastening to the second holders 18. The holding frames 20 can then be connected to the first holders 16.

Figure 4:
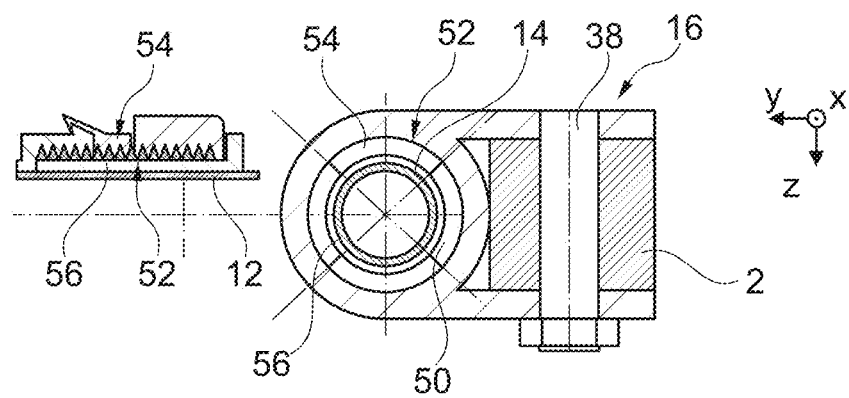
FIG. 4 shows a detail illustration of a first holder.
Figure 8:
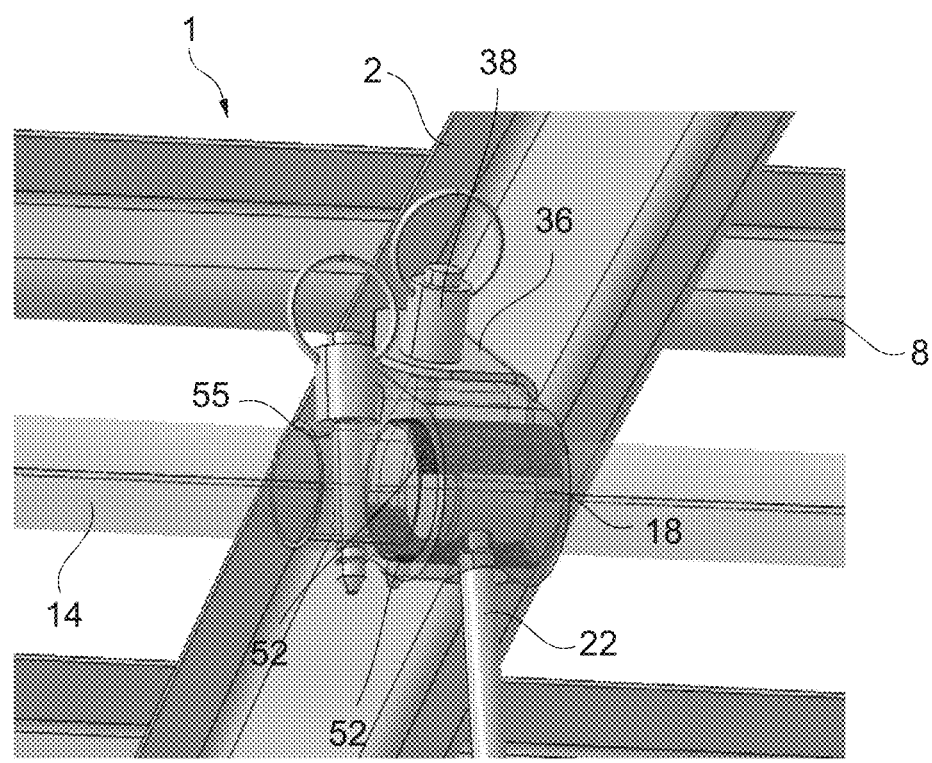
FIG. 8 shows a detail image of a second holder.

FIG. 4 shows, by way of example, a first holder 16 and FIG. 8 shows, by way of example, a second holder 18, which is fastened on the fuselage frame 2. For this purpose, the holding pin 38 or bolt 38 is indicated by way of example. The first holder 16 is distinguished by an opening 50, which has a first tooth system 52, which corresponds to a second tooth system 54 of a bolt or a bush 56. The bush 56 is connected in a fixed manner to the first base body 12, e.g. via a further slip-on bush 55, which is secured by means of a bolt 38 (see FIG. 8). As can be seen in FIG. 4, the tooth system 52 or 54 is provided only in certain regions, with the result that only 90° segments situated opposite one another are toothed. The segments can also extend over somewhat less than 90°. This enables the first base body 12 with bushes 56 arranged thereon to be passed through, after which a positive engagement can be produced by rotating the first tooth system and the second tooth system 52 and 54 relative to one another. This is shown in FIG. 4. By means of this configuration, assembly can be made significantly easier since all the first holders 16 can be mounted on the first base body 12 and then moved to a desired position. Only the subsequent rotation of the bush or of a part carrying the first tooth system 52 through 90° enables the first holder 16 to mesh with the first base body 12. This positive engagement enables the base body 12 to transmit forces along its direction of extent and consequently to distribute them over all the holders 16. The same option is chosen for the second holders 18 and the third holders 48.

FIG. 5*a* shows a first version of a fastening means, which can be mounted on a tube in the form of the first base body 12. It should first of all be noted that the first base body 12 has a circumferentially arranged opening 58 at a desired point. It is thereby possible to access the interior of the first base body 12. Arranged as a first connector at the location shown there is furthermore a fastening cylinder 60, which is provided with an opening 62. The fastening cylinder 60 is pushed through from an opening of the base body 12 as far as the desired point.

The opening 62 of the fastening cylinder 60 has a first tooth system 64, which just as in the case of the first holder 16, is arranged only in two mutually opposite segments, wherein the segments extend over a maximum of 90°. An elongate body 66 as a second connector is provided with a second tooth system 68, which is likewise embodied in the form of two mutually opposite segments. This has the effect that, in one orientation, the elongate body 66 can be introduced into the opening 58 of the first base body 12 and the opening 62 of the fastening cylinder 60 without further resistance. Only through rotation of the elongate body 66 does engagement of the toothed systems 64 and 68 occur.

As mentioned at the outset, the distance of the holding frame 20 from the fuselage frame can be influenced by means of the first holder 16. When the elongate body 66 is arranged on the holding frame 20, this can consequently be positioned in a variable manner by changing the insertion depth of the elongate body 66 in the fastening cylinder 60. This enables tolerances to be compensated very easily. As likewise mentioned above, a frame or a holder for instance, on which all the components 4 etc. to be installed are arranged, can be introduced directly into the cabin. By swiveling up and fastening the holding frames 20 on the first holders 16, one of the positions of the first holders 16 can be positioned independently of the holding frames 20 in the cabin. The necessary insertion depths of the elongate bodies 66 in the fastening cylinders 60 are thereby automatically obtained. Tolerance compensation can thus be carried out very quickly by subsequently screwing tight the elongate bodies 66 and securing them.

The same fastening process can be carried out to fasten an upper end of the holding strut 22. As shown in FIG. 8, the second holder 18 has an opening 57, through which the holding strut 22 can extend into the interior of the second holder 18 in order to enter into engagement with a fastening cylinder 60 arranged there.

A variant of a rotatable mounting of a component (not shown specifically) is shown in FIG. 5*b*. Here, a kind of pin is merely pushed through the first base body 12, wherein fastening of the relevant component can be carried out at an end 72 which projects from the base body 12.

FIG. 5*c* shows simple cable holders, which can be connected to the base body 12 by means of pins 76. Lines 80 can be laid or bonded onto these.

FIG. 5*d* shows a modification in the form of line holders 78, which are embodied in one piece and each surround the relevant line 80.

FIGS. 6*a*, 6*b* and 6*c* illustrate a tolerance compensating device 82, which has been mentioned briefly with reference to FIG. 1. Here, a kind of slide 84 is shown, said slide being pivotably connected to the holding strut 22. The slide 84 extends in a slideway 86 and projects outwards from an elongate aperture 88. An elongate locking element 90 has a shape such that it can be inserted into a depression 92 in the slide 84. This depression 92 has a first tooth system 94 and likewise a region of the slide 84.

The elongate locking element 90 is likewise provided with a second tooth system 96, which enters into mesh with tooth system 94 and tooth system 96 in FIG. 6B and is arranged on two segments of the profile of the elongate locking element 90 which are arranged opposite one another. If this locking element 90 is rotated through 90° about its longitudinal axis, the tooth systems no longer engage in one another, thus enabling the slide 84 to move freely in the slideway 86. As a result, the connecting region between the holding strut 22 and the holding frame 20 can be shifted in the second region 30.

Owing to the associated rotation of the holding strut 22 about the second holder 18, the distance between this connection point and the second holder 18 in the vertical is changed. Consequently, very fine alignment of the holding frame 20 in the horizontal can be achieved for a relatively coarse movement of the slide 84 in the slideway 86 by using the lever ratio. In addition to the fundamental adjustability of the second holder 18, it is consequently thereby possible to achieve fine adjustment.

Figures 7A, 7B:
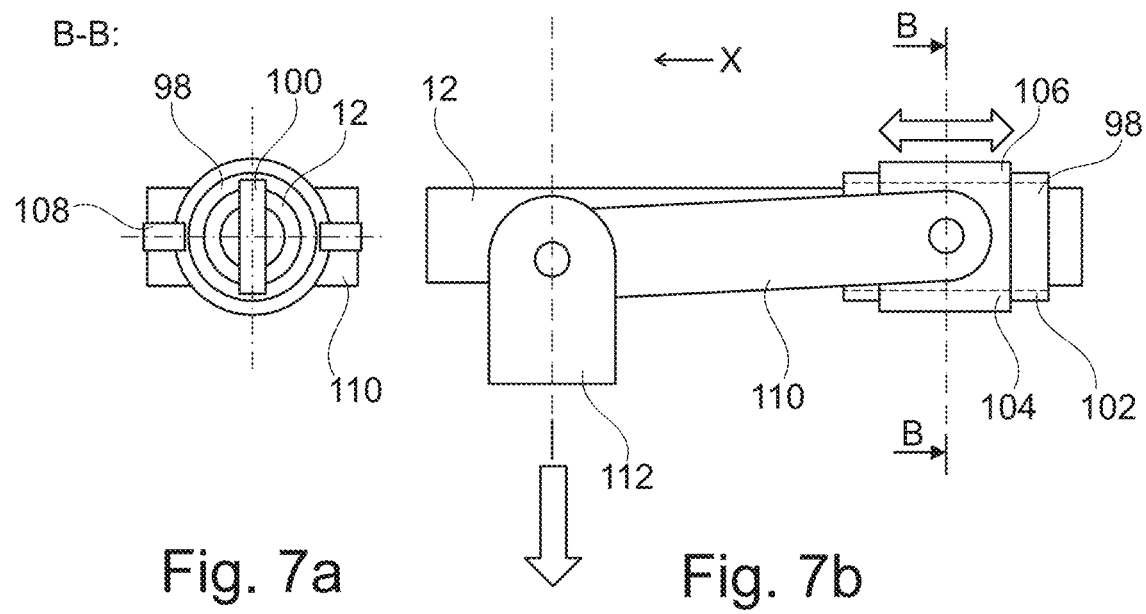
FIGS. 7a and 7b show fastening of a monument in some region or regions.

Another example of the fastening of a component is shown in FIGS. 7*a* and 7*b*. This concerns the fastening of a cabin monument at least by an upper end or a region remote from a floor. By way of example, the first base body 12 is shown once again here. This is fitted with a bush 98, which is connected to the base body 12. For example, the bush 98 can be secured on the base body 12 by means of a retaining pin 100.

The bush 98 has an external thread 102, which corresponds to an internal thread 104 of another bush 106. This second bush 106 has a shorter length than the first bush 98. By screwing, the position of the second bush 106 on the first bush 98 can be adjusted. The second bush 106 can be left in a desired position and can then be connected to a monument holder as an attachment link 110 in the form of an elongate strut by means of connecting pins, screws 108 or the like. A flange 112 of the monument can be mounted thereon, for example.

The monument can be secured on a floor of the cabin, for example, and can be connected to the base body 12 via the connecting links 110 by means of a region remote from the floor. The loads in the x direction which occur during the operation of the aircraft are consequently introduced into the base body 12. A monument can be connected by means of a plurality of such connecting links 110 and, as required, by means of a plurality of first bushes 98 and second bushes 106.

Figure 9A:
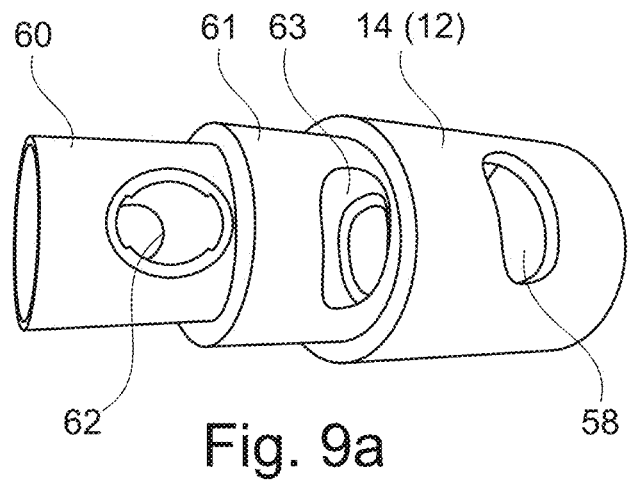
FIGS. 9a and 9b show acoustic decoupling of a fastening cylinder.
Figure 9B:
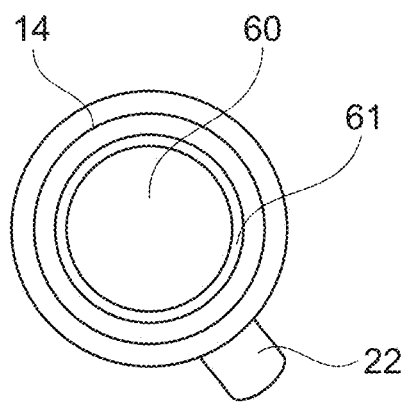

FIGS. 9a and 9b illustrate another aspect of the disclosure. Here, by way of example, the illustration from FIG. 5a or FIG. 5b is referred to. The fastening cylinder 60 in the first base body 12 or the second base body 14, which, in the latter case, is connected to the holding strut 22, is modified somewhat in the variant shown in FIGS. 9a and 9b. Here, the fastening cylinder 60 is dimensioned with a somewhat smaller diameter than in the previous illustrations. In addition, a decoupling component 61 is provided, which surrounds at least a significant part of the fastening cylinder 60. At the same time, it is dimensioned in such a way that it can be inserted into the base body 12 or 14 when it surrounds the fastening cylinder 60. Consequently, the decoupling component 61 forms a ring around the fastening cylinder 60.

The decoupling component 61 can be produced from a different material than the fastening cylinder 60. In particular, the material can be softer. As a result, the mechanical contact between the fastening cylinder 60 and the second base body 14 is damped. In particular, vibration-induced rattling of the fastening cylinder 60 in the base body 12 or 14 is thereby prevented. It is conceivable for the fastening cylinder 60 to be composed of a metallic material, as can the base body 12 or 14. In this case, rattling could occur in the case of load changes owing to the dimensional tolerances between these two elements. This can be prevented by means of the decoupling component 61. This can be produced, for instance, from a flexible plastic, e.g. a thermoplastic. As an alternative, a rubber would be possible. As a result, the contact noise between the damping component 61 and the base body 12 or 14 concerned is significantly less than with metal components. Consequently, very significant noise decoupling can occur through the arrangement of the decoupling component 61 between the fastening cylinder 60 and the second base body 14.

In order to insert the opening 62 of the fastening cylinder 60 through the opening 58 of the base body 12 or 14, the decoupling component 61 has a cutout 63, which is brought into alignment with openings 58 and 62. If the decoupling component 61 is attached to the second base element 14, as explicitly shown in FIG. 9b, the cutout 58 is preferably embodied as a slotted hole.

Figure 10:
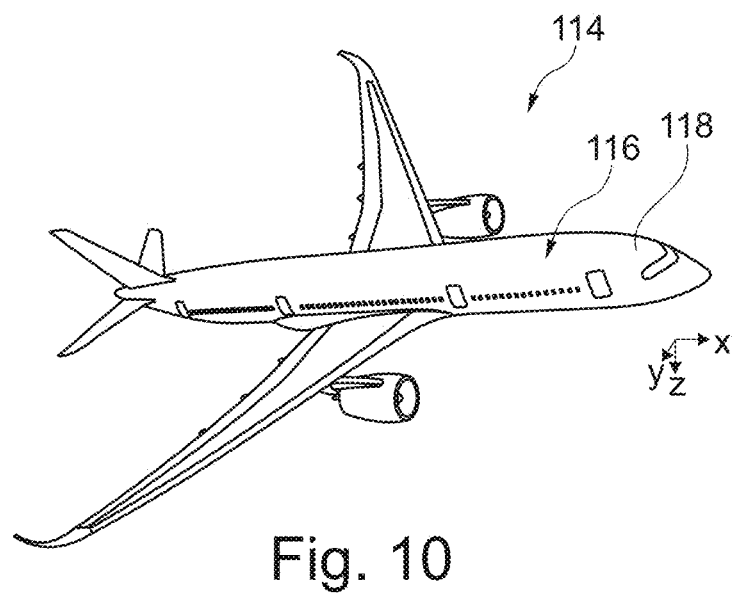
FIG. 10 shows an aircraft with components arranged thereon.

Finally, FIG. 10 shows a passenger aircraft 114 with an interior embodied as a cabin 116 in a fuselage 118 and with a plurality of components 4 arranged therein.

For the sake of completeness, it should be noted that "having" does not exclude any other elements or steps and "a" or "an" does not exclude a multiplicity. It should furthermore be noted that features which have been described with reference to one of the above embodiment examples can also be used in combination with other features of other embodiment examples described above. Reference signs in the claims should not be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A fastening system for fastening components on a fuselage structure in an interior of an aircraft, the fastening system comprising:
    a holding frame with a first edge and a second edge spaced apart from the first edge;
    at least one first holder, which can be coupled to the fuselage structure and is embodied for articulated connection to the holding frame in a first region of the holding frame, said region being close to the first edge;
    at least one second holder, which can be coupled to the fuselage structure; and
    at least one holding strut, a first end of which can be connected in an articulated manner to the second holder and a second end of which can be connected in an articulated manner to the holding frame in a second region adjacent to the second edge and remote from the first edge;
    wherein the holding frame, the holding strut, the first holder, and the second holder are configured to form a triangular structure with the first and second holder, which are arranged spaced apart from one another along a circumferential direction of the fuselage structure;
    wherein the holding strut and the holding frame form a first side and a second side of the triangular structure; and
    wherein at least one of the holding frame, the holding strut, the first holder and the second holder is designed to variably set a length of the first side and/or of the second side in order to adjust the position of the holding frame.

2. The fastening system according to claim 1, further comprising at least one elongate base body, wherein the at least one elongate base body is fastenable on a plurality of first and/or second holders and is configured to introduce a force acting along an axis of extent of the base body into a plurality of first and/or second holders.

3. The fastening system according to claim 2, wherein the first holders and the second holders are configured to rigidly retain the respective base body.

4. The fastening system according to claim 1, wherein the first base body and the second base body are each configured as a tube.

5. The fastening system according to claim 1, wherein the first holder is configured to set an adjustable spacing between the first region of the holding frame and the first holder.

6. The fastening system according to claim 5, wherein:
the first holder has a first connector with an opening that has a first tooth system in some region or regions, and a second connector with an elongate body that has a second toothing in some region or regions; and
in a first alignment with respect to the opening of the first connector, the elongate body is insertable into said opening and, by rotation into a second alignment, establishes a positive joint between the first tooth system and the second tooth system.

7. The fastening system according to claim 6, further comprising a decoupling component made from a plastic, which surrounds the first connector at least partially in the form of a ring.

8. The fastening system according to claim 1, wherein the holding strut or the second holder has a first connector with an opening that has a first tooth system in some region or regions, and a second connector with an elongate body that has a second tooth system in some region or regions, wherein, in a first alignment with respect to the opening of the first connector, the elongate body is insertable into said opening and, by rotation into a second alignment, establishes a positive joint between the first tooth system and the second tooth system.

9. The fastening system according to claim 1, further comprising at least one tolerance compensating device, which is arranged in the second region of the holding frame, wherein the tolerance compensating device is connectable to the holding strut and is configured to shift and lock a connecting position of the holding strut on the holding frame between the second edge and the first edge.

10. The fastening system according to claim 9, wherein:
the tolerance compensating device has a slide, which is pivotably connected to the holding strut, and an elongate depression, which is arranged on the holding frame and has a slideway extending along the extent of the depression to provide sliding guidance for the slide;
the depression and the slide are each provided with a first tooth system in some region or regions; and
an elongate locking element with a second tooth system in some region or regions is positioned in the depression and is configured to establish a positive joint between the first tooth system and the second tooth system in a first alignment, such that the position of the slide on the slideway is locked, and to release the positive joint in a second alignment.

11. The aircraft according to claim 10, wherein the fuselage has a longitudinal axis, a right-hand side, a left-hand side, and at least one elongate base body on each side of the fuselage along a significant part of the fuselage.

12. The aircraft according to claim 11, further comprising at least one monument and at least one monument holder, wherein the monument stands on a floor arranged in the fuselage and is connected by the at least one monument holder, by means of a monument section spaced apart from the floor, to one of the base bodies.

13. The aircraft according to claim 11, wherein the monument holder comprises an elongate strut connected by one end to the section of the relevant holder which is spaced apart from the monument along the longitudinal axis and by another end to the monument.

14. An aircraft comprising:
a fuselage with a fuselage structure;
a fastening system according to claim 1; and
at least one component fastened on the fuselage structure by the fastening system.

15. The aircraft according to claim 14, wherein the component is a service unit for passengers or an overhead storage bin.

* * * * *